Dec. 29, 1953 J. PERRELLI 2,664,127
PEACH PITTER
Filed Nov. 5, 1951 2 Sheets-Sheet 2
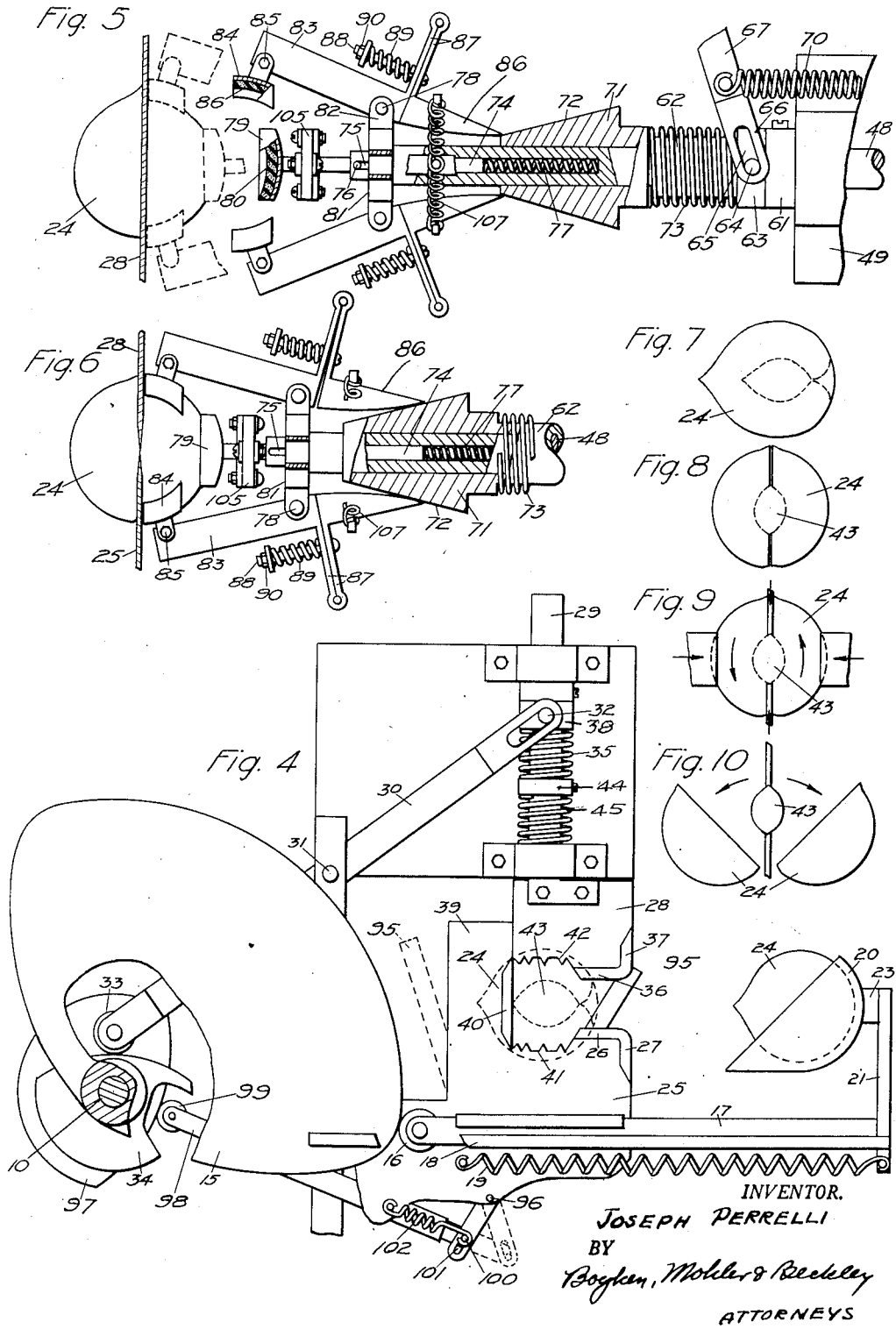
INVENTOR.
JOSEPH PERRELLI
BY
Boyken, Mohler & Beckley
ATTORNEYS Patented Dec. 29, 1953

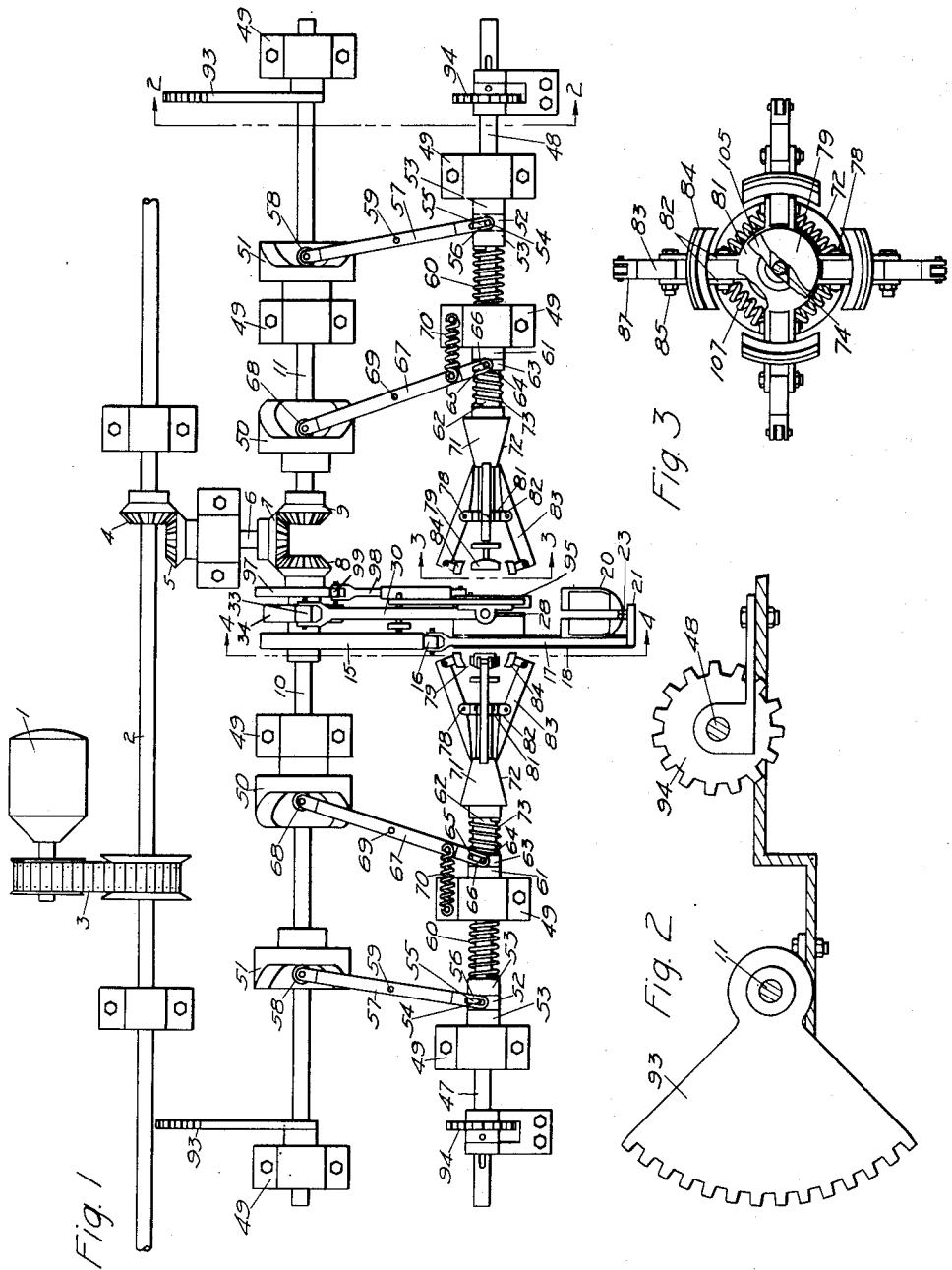

2,664,127

UNITED STATES PATENT OFFICE 2,664,127

PEACH PITTER

Joseph Perrelli, Richmond, Calif., assignor to Filper Corporation, a corporation of California Application November 5, 1951, Serial No. 254,927

10 Claims. (Cl. 146—28)

1

This invention relates to a pitter for drupes, such as peaches, and has for its principal object the provision of a pitting machine that is adapted to remove the pits from clingstone peaches and the like substantially without waste and without objectionable mutilation of the flesh of the fruit.

Heretofore many attempts have been made to remove the pits from clingstone peaches with the minimum of waste. In most instances pitting knives of the spoon type and partly annular bands sharpened or sharpened and serrated along their cutting edges have been employed. Complicated control means have been devised in an attempt to make flexible pitting blades follow the contour of the pits so as to reduce waste. Other efforts involve the use of wires between which each pit is passed to free the body of the peach from the pit, and to also halve the peach.

In some of these prior attempts the flesh of the fruit is mutilated to a noticeable and undesirable degree and a substantial amount of flesh is left on the pit, and in practically all attempts of which I am aware the latter objection is present, namely; an undesirable amount of fruit remains on the pit.

The reason for the above condition lies in the lack of uniformity of pits and fruit bodies as to size and shape and the lack of uniformity in the position of the pit within each body.

Where fruit remains on the pit, there is not only a reduction in the size of the fruit halves, but their appearance is not pleasing and a can of a predetermined number of halves will be light, with a consequent reduction in value, or else more fruit must be packed in the can at an added cost to increase the weight. Furthermore, the disposal of the pits is more expensive since the drying cost of the pits increases in direct proportion to the amount of fruit left on the pits. In many instances were there only a small increase in the weight of fruit halves per unit in a can the fruit so canned would qualify for the next higher grade fruit, with a corresponding increase in the price received for such fruit.

With the present invention, the fruit, such as whole clingstone peaches, are cleanly halved and the pit is removed without splitting or halving the pit (as is done in many types of pitters) and with practically no loss or waste in the flesh of the fruit irrespective of differences in the size and shape of the fruit bodies or pits, and irrespective of the slight irregularities that occur in the positions of the pits within the fruit bodies.

The accomplishment of the above results is one of the objects of the present invention, and a still further object is the method of so accomplishing said results.

Other objects and advantages will occur in the description and in the drawings.

In the drawings,

Fig. 1 is a plan view of the main portion of the machine.

Fig. 2 is an enlarged sectional view taken along line 2—2 of Fig. 1.

Fig. 3 is an enlarged view taken along line 3—3 of Fig. 1.

Fig. 4 is an enlarged view, partially broken away, taken along line 4—4 of Fig. 1.

Fig. 5 is an enlarged, fragmentary, sectional view of part of the machine for rotating the peach halves, two of the four fruit engaging elements being shown in elevation preparatory to engaging said halves, and dash lines indicating such engagement.

Fig. 6 is a view similar to that of Fig. 5, but showing the fruit halves engaged, and with one of the elements under greater tension than the other.

Figs. 7, 8, 9, 10 diagrammatically illustrate the successive steps in the present method of pitting a peach or the like.

In the more detailed description that follows, the invention will be described with respect to a clingstone peach, but it is to be understood that this is not to be considered as being a restriction of the invention to clingstone peaches.

In the present machine a motor 1 is connected with a shaft 2 by any suitable means such as by a conventional variable speed transmission 3. Shaft 2, in turn, is journalled for rotation in suitable bearings and is provided with a gear 4 for each of the pitters of this invention, it being understood that a plurality of such pitters may be connected with shaft 2 for actuation thereby.

A gear 5 on shaft 6 is connected with gear 4 for being driven by the latter, and a bevel gear 7, also on shaft 6 has its teeth in mesh with a pair of coaxial bevel gears 8, 9 on coaxial shafts 10, 11 that extend oppositely from gear 7.

From the foregoing arrangement it will be apparent that shafts 10, 11 will be driven oppositely upon rotation of shaft 6.

A cam 15 is secured on shaft 10 and the periphery of said cam is in engagement with a cam follower 16, which cam follower is on one end of a bar 17. Bar 17 is reciprocably held in slide 18 for reciprocation thereof as the cam follower follows the periphery of cam 15 when the latter is rotated, and a spring 19 (Fig. 4) connects the bar 17 with a stationary part of the machine for yieldably holding the cam follower in engagement with cam 15 at all times.

On the end of bar 17 that is opposite the cam follower is a peach positioning and holding member 20 that may be in the form of a partial cup bisected or slotted in a plane parallel and opposed to one in which the bar 17 is disposed.

In the machine illustrated, the bar 17 extends horizontally and spring 19 may be below or to one side of it. The shafts 10, 11 are horizontal and the peach holder 20 is above the bar 17 and is connected with the latter by an upstanding bracket 21 that extends from bar 17 to a position at the rear side of said holder. A short pair of arms 23 connects the holder to said bracket, and the halves of the holder are at opposite sides of a vertical plane extending between said arms. The holder consists of a cup-like member tilted so that one side is lowermost while the other is elevated with the lower side leading as the bar 17 moves toward the cam 15. Thus a peach 24 may be positioned within member 20 for forward movement toward cam 15, but if the peach is held at the end of its forward movement, member 20 will return without said peach. The slot bisecting member 20 is vertical and in the vertical plane of said movement.

Between the member 20 and shaft 10 is positioned a lower stationary vertical blade 25 (Fig. 4) that is adapted to enter the slot in member 20 when the latter is at the forward end of its stroke. This blade 25 has a horizontally extending upwardly directed cutting edge 26 that joins with a downwardly extending cutting edge 27, the latter being directed toward the member 20 when said member is at the rear or retracted end of its stroke preparatory to moving toward said blade.

Above blade 25 and coplanar therewith is a vertical guillotine upper blade 28 that is carried by a vertically reciprocable post 29 for reciprocation toward and away from blade 25.

The reciprocation of post 29, and consequently blade 28, is effected through the medium of a lever arm 30 that is horizontally pivoted at 31 to a stationary part of the frame of the machine. Pivot 31 is intermediate the ends of lever arm 30. One end of said arm is slotted for receiving pins 32 on a collar 38 that is slidable on post 29, and the other end carries a cam follower 33 that engages the periphery of a cam 34 on shaft 10 (Figs. 1, 4). A spring 35 on post 29 reacts between collar 38 and a collar 44 that in turn is secured to post 29 to yield if the pit engaged by blade 28 is unusually large and a spring 45 (Fig. 4) around post 29 functions to yieldably hold the blade 28 elevated and to hold cam follower 33 in engagement with cam 34.

The lower edge of the blade 28 is formed with a cutting edge 36 that is parallel with edge 26, and with a cutting edge 37 that is directed toward the peach holding member 20 and that joins with edge 36.

Returning to the lower stationary blade 25, this blade has an upstanding extension 39 provided with a cutting edge 40 that is directed toward the member 20.

The upper blade 28 is in substantially edge to edge engaging relationship with the upstanding extension 39 along the forward edge of the latter.

Blades 25 and 28 are complementally formed with square toothed sections or edges 41, 42, the toothed section on blade 25 being adjacent to edge 40 as is the toothed section on blade 28, and the teeth on said sections are directed toward each other with the teeth of each section being along a slightly curved line that substantially follows the curved opposite edges of a pit 43 when the latter is positioned with its root-stem axis horizontal and with its suture in a vertical plane.

When blade 28 is at the upper end of its stroke the distance between their horizontally extending cutting edges 26, 36 is slightly greater than the maximum diameter pit in the fruit to be pitted, the measure being taken perpendicular to the longitudinal axis of the pit in the plane of its suture.

By the above structure, it will be seen that the flesh of a peach positioned in member 20 with its suture in a vertical plane and with the stem end of the peach directed away from the blades 25, 28 will be substantially bisected in the plane of said suture by being carried between said blades upon movement of the member 20 toward said blades.

Said movement of said member 20 is such that the blossom end of the pit (which is the leading end during said movement), will be carried into engagement with the cutting edge 40 of the upward extension 39 of blade 25. The spring 19 will prevent an extra large pit from being positively driven onto the edge 40.

The timing of cams 15, 34 is such that practically as soon as the pit 43 (Fig. 4) of peach 24 reaches the edge 40, the upper blade 28 will move downwardly, and the square teeth of sections 41, 42 will engage opposite edges of the pit, and at the same time the flesh of the peach will be bisected, or substantially so for all practical purposes. However, the pit is not split or bisected by blades 25, 28. It is merely gripped between the toothed sections 41, 42. These are the first steps in the operation, namely; the whole drupe, such as a clingstone peach is moved along a path of travel with its blossom end leading and the pit of said peach is gripped within the body of flesh therearound at a point in said path, and during said travel of said peach to said point the flesh of the peach is substantially bisected in the plane of the suture of the pit and body.

The station where the pit is held between the toothed sections 41, 42 is the pitting station. When said pit is so held the halves of the body of the peach are tightly adhered to the said pit at opposite sides of blades 25, 28. It may be said that said halves are supported on the pit, since they would fall were it not for such adherence, assuming no other support were present. At the opposite sides of the fruit halves at the pitting station is a pair of horizontally extending coaxial shafts 47, 48. These shafts are supported in suitable bearings 49 on the frame of the machine for horizontal reciprocation. Inasmuch as the elements on one of said shafts and their manner of operation, is substantially the same as that of the elements on the other shaft, the numbers used in describing the identical structure on both shafts will be the same.

Shafts 10, 11 each have a pair of axially directed cams 50, 51 secured thereon. The cams 50 are nearest the adjacent ends of shafts 10, 11 at bevel gear 7 and the cams 51 are equally spaced oppositely outwardly of the pair of cams 50. Suitable cam followers engage said cams as will later be explained.

The following detailed description of shaft 48 which is shown in Figs. 1, 5, 6 applies equally to shaft 47.

On shaft 48 is a collar 52, which collar is held between a pair of collars 53 that in turn may be adjustably secured to the shaft 48 by set screws. This collar 52 has oppositely outwardly projecting pins 54 thereon that extend into corresponding slots 55 in the arms 56 of a clevis that is at one end of a lever 57. The opposite end of lever 57 carries a cam follower 58 that is held in engagement with cam 51 on shaft 11. Said lever 57 is pivotally connected with the stationary frame of the machine by pivot 59.

The cam follower 58 is held against cam 51 by a coil spring 60 around shaft 48 that reacts between one of the bearings 49 and the collar 53 nearest thereto.

By the foregoing structure, it will be seen that the shaft 48 will be reciprocated axially upon rotation of shaft 11.

At the opposite side of the bearing 49 that engages one end of spring 60 is a collar 61. This collar may engage said bearing when the shaft 48 is at its farthest point to the right, as seen in Fig. 1.

Adjacent to collar 61, and also reciprocable on shaft 48 is an elongated sleeve 62 (Fig. 5). The collar 61 is secured on the end of sleeve 62 that is nearest thereto, and abutting collar 61 is a collar 63 that is reciprocable on said sleeve. This collar 63 may have pins 64 thereon corresponding to pins 54 on collar 52, and which pins 64 extend into corresponding slots 65 formed in the arms 66 of a clevis that is on one end of a lever 67. The other end of lever 67 carries a cam follower 68 that is held against cam 50. A pivot 69 between the ends of lever 67 pivotally connects said arm with a stationary part of the machine.

A spring 70 may connect the end of lever 67 that is adjacent to clevis 66 with any suitable part of the frame of the machine to insure retraction of sleeve 62 to the right, as seen in Figs. 1 and 5.

The end of sleeve 62 that is opposite the end carrying collar 63 is formed to provide a conical member 71, the tapered sides 72 of which are coaxial with the axis of shaft 48 and extend divergently from the end of sleeve 62 that is opposite the collar 61. The largest diameter end of member 71 is larger than the diameter of the cylindrical end of sleeve 62 that carries the collar 61 and on which the collar 63 is reciprocable. A coil or helical spring 73 on said cylindrical end of sleeve 62 reacts between collar 63 and a shoulder on said sleeve adjacent to the larger diameter end of member 71 to yieldably urge the collar 63 against collar 61.

The end of shaft 48 that is nearest to the shaft 47 is coaxially bored out to reciprocably receive one end portion of a rod 74 therein. The end portion of shaft 48 that is so bored out is axially slotted as at 75 (Fig. 5) to receive a radially projecting pin 76 secured on said rod 74.

A spring 77 within the rod receiving hole reacts between the closed end of the latter and the end of said rod 74 so said rod will rotate with said shaft for yieldably urging the rod 74 in a direction outwardly of the hole, or toward the shaft 47, but the pin 76 engages one end of slot 75 to retain the rod in said hole and to limit its movement outwardly thereof.

The rod 74 projects outwardly of the shaft 48 and has a peach engaging plate 79 thereon. This plate is curved so that its convex side is connected with the rod, and its concave side will face a peach 24 that is held by its pit between blades 25, 28. A relatively soft rubber or plastic layer 80 may be carried on the concave side of the plate 79 for engaging the outer side of one of the peach halves, and the curvature of said concave side preferably substantially corresponds to the curvature of the side of the peach to be engaged thereby.

Secured on the shaft 48 adjacent to the inner end thereof (which is the end nearest shaft 47) is a tubular element 81 that has a plurality of pairs of ears 82 projecting radially therefrom at the end of said member nearest the inner end of said shaft 48.

In the drawing (Fig. 3) four equally spaced sets of said ears are shown, and between each pair is an arm 83 that is pivotally secured at 78 to each such pair.

The arms 83 engage the outer surface of the smaller diameter end of the conical member 71 at one of their ends and extend divergently outwardly in direction away from said smaller diameter end and toward the other shaft 47, which, as already stated carries all of the members described for shaft 48 including corresponding arms 83 that have their divergently disposed ends adjacent to the divergently disposed ends of the arms on shaft 48.

The divergently disposed ends of the arms 83 have generally radially inwardly facing and radially inwardly projecting pads or fingers 84 secured thereto by bolts 85 so that said faces may be adjustably tilted relative to the said arms 83.

The radially inwardly directed faces 86 of each of the fingers or pads 84 may be of relatively soft rubber or plastic material and concavely curved to correspond to the curved outer surface of a peach 24 that is held between blades 25, 28.

The surface layers of the fingers 84 and the layer 80 of plate 79 are not so soft as to be unstable when they engage the fruit, but they will not cut into the flesh at their edges when pressed against the latter, nor mutilate the fruit, and they are preferably not moisture absorbent.

The end 86 of each arm 83 that engages the member 71 is preferably hingedly connected with the remainder of the arm by means of a pair of hinge leaves 87, that extend perpendicularly from arms 83 outwardly and that are hingedly joined at their outer ends. The free inner ends of said arms are respectively secured to the portion 86 and to the remainder. When no pressure is against the finger 84 on any arm (in a radially outward direction) the portion 86 and the remainder are substantially coaxial, or about at their adjacent ends, but when a predetermined outwardly directed pressure is placed on any finger, or its movement radially inwardly is resisted by a predetermined pressure, the portion 86 and the remainder may buckle slightly at their adjacent ends, as seen in the top arm of Fig. 6.

The structure provides that the arms 83 will yield at certain resistances, a pin 88 is secured to one leaf of each hinge and this pin slidably extends through a slot in the other leaf. A coil spring 89 reacts between said other leaf and an adjustable nut 90 on the outer end of the pin 88. Thus each of the divergent outer end portions of arms 83 may be made to have the same or different resistances to pressure against the fingers. This may be quite important, as will later appear.

In Figs. 7 to 10 the several steps in the method are diagrammatically illustrated apart from the specific apparatus described. An understanding of the method will help to make clear the operation of the machine.

Each peach 24 is first positioned so that its suture is in a predetermined plane (Fig. 7). In the present instance a vertical plane is preferable since the operator can more readily position each peach accurately in this plane.

The next step (Fig. 8) is to cut the body or flesh of the peach in the plane of its suture to the pit 43. Inasmuch as the suture of the pit is in the same plane as that of the body, the latter will be cut to the edges of the pit. In the case of clingstone peaches the flesh of the halves at opposite sides of the cut will be firmly adhered to the pit. In the case of freestone drupes, which could also be pitted by the present invention, both as to machine and method, it frequently occurs that there is adherence between the pit and the flesh of the fruit. Such adherence seems to be more in certain years than in others and has resulted in difficulty in pitting freestone drupes by pitters that have been designed for freestone fruit only.

In Fig. 9 is shown the step of holding the pit from opposite sides and at the same time pressing the halves at opposite sides of the cut toward each other (and against the held pit) and also rotating the halves and the pit relatively while applying said pressure whereby the pit is clearly sheared from the halves without enlargement of the cavities formed by the pit in the said halves in the normal growth of the peach or drupe. There is no loss of valuable flesh through adherence of fruit to the pit after the pit is free from the halves, and in the case of clingstone peaches, the halves, both before and after canning, bear a resemblance to freestone fruit in that the pit cavities are small and have the highly desired appearance of heavy fruit, which is the fact.

In Fig. 10 the final step shows the halves released from the pit and falling away from the latter. It is not absolutely essential that the pit be held while the halves fall away since the halves and the pits are free from each other and are readily separated. Upon falling on a conveyor or platform of spaced rods, or upon delivery of the halves and pits to such a conveyor or platform, the pits would readily fall through the latter while the halves were held thereon. By permitting the halves to fall away from the pit before the pit is released, there is greater assurance that the pits will not fall into the pit cavity of one of the halves as the latter falls away.

In carrying out the above method by the machine, the motor 1 is connected with the shafts 10, 11, as described, and is actuated for driving said shafts oppositely. This results in the rotation of cams 15, 34 on shaft 10, and the rotation of cams 50, 51 on each of the shafts 10, 11, and also the reciprocation of the collars 52 and 63 on shafts 47, 48 according to their relative arrangement.

Upon a peach being positioned on the holder 20 the action of cam 15 will move the whole peach 24 to the dotted line position shown in Fig. 4 in which the pit is between the square toothed sections 41, 42.

When in the said position the flesh of the peach is substantially bisected about the pit, and all that remains is for the upper blade 28 to move downwardly so that the toothed sections 41, 42 firmly grip the pit between them to substantially complete the bisection of the fruit. The recess at the stem end of the pit does not make it necessary for the edges 36, 26 to come together in order to complete the bisection of the flesh.

The cam 34 is so arranged that the lever 30 will be actuated for causing the blade 28 to move downwardly for gripping the pit as soon as the pit of such peach is between said toothed sections 41, 42. The holder 20 will, of course, be withdrawn when the blade 28 descends.

Thus lowering of the blade 28 may cause a slight downward movement of the peach, and after such movement, and as soon as the pit is gripped between sections 41, 42, the rotation of cams 51 will cause the pressure plates 79 to move axially of the shafts 47, 48 into engagement with the opposite sides of the peach centrally of each of the halves. The shafts 47, 48 themselves will have been moved toward each other by the action of cams 51, so as to carry the fingers 84 on arms 83 to positions radially outwardly of the respective halves of the peach.

As soon as said fingers 84 are over the peach halves, the cams 50 are arranged so that they will cause the conical members 71 on shafts 47, 48 to move axially of the latter and toward each other, with the result that the arms 83 will be swung to bring the fingers 84 into yieldable engagement with each of the halves adjacent to the cut that defines the cut faces of the halves, as seen in Fig. 6 or in the dotted line position of the fingers in Fig. 5.

On the outer end of each shaft 10, 11 is a segmental or interrupted gear 93 (Figs. 1, 2) and in a corresponding plane with each gear 93, there is a pinion 94 splined on each shaft 47, 48. The relative diameter between gears 93 and pinions 94 is such that a quarter turn of shafts 10, 11 will result in a full rotation of shafts 47, 48 when the teeth on gears 93 are in mesh with the teeth on the pinions. Due to the gears 7, 8, 9, such rotation of pinions 94 (and consequently rotation of shafts 47, 48) will be in opposite directions.

The action of cams 15, 34, 50 and 51 in effecting the positioning of the peach up to and including the gripping of the fruit halves by fingers 84 is accomplished during the three quarters of the revolution of shafts 10, 11 when the teeth on gears 93 are out of engagement with the teeth on pinions 94. The engagement of said teeth during the final quarter revolution of shafts 10, 11 results in revolving the peach halves oppositely while the pit is held and the said halves will then be free from the pits and the fingers 84 will be back in their original positions when they will be retracted and moved away from the halves under the action of cams 50. Also, the action of cams 51 will cause retraction of the pressure plates 79 and the halves will freely drop from the pits.

In the event the pit should not fall from between the blades 25, 28, as soon as the blades are moved apart (elevation of blade 28) a sweep arm 95 pivoted at 96 to a stationary part of the machine will be actuated by rotation of a cam 97 on shaft 10 for sweeping across a side of the blades and into engagement with such pit for knocking it free. An arm 98 having a follower 99 at one end and a pin 100 at the opposite end that in turn projects into a slot 101 in the lower end of sweep arm 95 provides the connection between the cam 97 and said arm. Spring 102 holds the cam follower 99 into engagement with cam 97 at all times, said spring connecting pin 100 or any suitable projection on arm 98 with a stationary part of the machine.

A flexible connection 105 between the pressure plates 79 and each of the rods 74 enables the plates to adjust their positions to accommodate any irregularities in the peach halves, and the yieldable hinge connections 87 between the portions 91 of arms 83 and their outer ends permit one or more of the fingers to "give" in the event such fingers exert more pressure on the halves than others due to irregularities in the contours of the halves or due to an eccentric position of the halves relative to the axis of shafts 47, 48.

The springs 77 compensate for different sizes of fruit, so there will be no mutilation of the fruit in the event extra large peaches are fed to the blades.

Around the portions 86 of arms 83 is a spring 107 that yieldably holds the inner ends of the arms against the cone members 71 and that spreads the finger carrying ends of the arms when the cone members are retracted.

The springs 73 also prevent objectionable pressure being placed on the fruit by the fingers 84. Every element that engages the pit and fruit halves is so arranged as to provide a yieldable engagement so the pits and the flesh of the fruit will not be mutilated irrespective of differences in size and shape and unusual irregularities in the contours of the pits and the bodies of the fruit.

The timing of cam 15 relative to cams 50, 51 and their relative shapes are such that the cam 15 will move blade 28 into gripping relation to the pit for holding the latter after the fingers have gripped the peach halves. Thus the peach will be centered by the fingers before the pit is gripped. This will insure a tight and substantially uniform hold on the halves by the fingers before the halves are rotated. Otherwise the peach might not be gripped with sufficient uniformity by the fingers to effect their separation from the pit.

The flexible connection 105 between the pressure plates 79 and the rod 74 enables the plate to yield sufficiently to permit the plate to follow any unusual contour of the surface of the peach.

I claim:

1. A drupe pitter comprising a pair of coplanar, spaced pit gripping members supported for movement of one member toward the other to a position gripping the pit of a drupe therebetween with the halves of said drupe adhered to the pit at opposite sides of the plane in which said members are disposed, cutting means for cutting the body only of said drupe to said pit and in said plane, drupe gripping elements at opposite sides of said plane supported for movement into circumferential frictional gripping engagement with the halves of the bisected body of said drupe when its pit is held between said members, means for so moving said elements, means for rotating said elements relative to said members about an axis extending through said pit and perpendicular to said plane for freeing said pit from said halves, a pair of devices separate from said elements at opposite sides of said plane and drupe when the latter is gripped by said elements supported for movement into engagement with the outer sides of said halves at points on said axis and for rotation on said axis, means for so moving said devices and means for holding said devices in yieldable engagement with said halves during said rotation of said halves by said elements.

2. A pitter for clingstone peaches comprising: a substantially coplanar cutting means for making a planar cut in the flesh of the peach and for gripping the pit including a pair of gripping portions supported to move one relative to the other substantially in the plane of the cut in the peach, means for moving the gripping portions into and for holding the said portions in firm engagement with the pit, a pair of rotatable peach gripping elements disposed on opposite sides of the plane of said cutting means, means to move the elements into gripping engagement with the flesh of the peach, and means for rotating the gripping elements and the flesh of the peach relative to the gripping portions on an axis normal to said plane.

3. A pitter for clingstone peaches comprising: a substantially coplanar cutting means for making a planar cut in the flesh of the peach, a pair of gripping means supported to move one relative to the other substantially in the plane of the cut in the peach, means for moving the gripping means into and for holding the said gripping means in firm engagement with the pit, a pair of rotatable peach gripping elements disposed on opposite sides of the plane of said cutting means, means to move the elements into gripping engagement with the flesh of the peach, and means for rotating the gripping elements and the flesh of the peach relative to the gripping means on an axis normal to said plane.

4. A pitter for clingstone peaches comprising: a pair of gripping means supported to move one relative to the other into the flesh of the peach, means for moving the gripping means into and for holding the said gripping means in firm engagement with the pit, a pair of rotatable peach gripping elements disposed on opposite sides of the plane of said gripping means, means to move the elements into gripping engagement with the flesh of the peach, and means for rotating the gripping elements and the flesh of the peach relative to the gripping means on an axis normal to said plane.

5. A pitter for clingstone peaches comprising: a substantially coplanar cutting means for making a planar cut in the flesh of the peach, a pair of gripping means supported to move one relative to the other substantially in the plane of the cut in the peach, means for moving the gripping means into and for holding the said gripping means in firm engagement with the pit, a pair of rotatable peach gripping elements disposed on opposite sides of the plane of said cutting means, means to move the elements radially and axially into gripping engagement with the flesh of the peach, and means for rotating the gripping elements and the flesh of the peach, relative to the gripping means on an axis normal to said plane.

6. A pitter for clingstone peaches comprising: a substantially coplanar cutting means for making a planar cut in the flesh of the peach, a pair of gripping means supported to move one relative to the other substantially in the plane of the cut in the peach, means for moving the gripping means into and for holding the said gripping means in firm engagement with the pit, a pair of rotatable peach gripping elements disposed on opposite sides of the plane of said cutting means, means to move the elements radially and axially into gripping engagement with the flesh of the peach, and means for rotating the gripping elements and the flesh of the peach in opposing directions relative to the gripping means on an axis normal to said plane.

7. A pitter for clingstone peaches comprising: a substantially coplanar cutter for making a planar cut in the flesh of a peach, a pair of pit gripping means supported for movement of one relative to the other in the plane of the cut in the peach, means for moving said pit gripping means relatively and into and for holding said pit means in firm engagement with the pit, a pair of peach gripping means disposed on opposite sides of the plane of said cutter, means for moving said peach gripping means into firm engagement with the periphery of substantially the maximum diameter of the peach on either side of the cut, said pit gripping means and said peach gripping means being supported for rotation of one relative to the other about an axis normal to said plane, supporting means so supporting said pit gripping means and said peach gripping means for said relative rotation, and means for rotating the pair of said pit gripping means and said pair of peach gripping means relative to each other.

8. A pitter for clingstone peaches comprising: a pair of pit gripping means supported for movement of one relative to the other into the flesh of a peach and in a plane substantially bisecting said peach, means for moving the pit gripping means relatively and into and for holding said pit gripping means in firm engagement with the pit, a pair of peach gripping means disposed on opposite sides of said plane and of the peach having its pit held by said pit gripping means, means for moving said peach gripping means into firm engagement with the periphery of substantially the maximum diameter of the peach on either side of the plane, means supporting said pair of pit gripping means and said pair of peach gripping means for rotation of one pair of peach gripping means for rotation of one pair relative to the other pair about an axis extending perpendicular to said plane and means for rotating said one pair relative to said other pair.

9. A pitter for clingstone peaches comprising: a pair of pit gripping means supported for movement of one relative to the other into the flesh of a peach and in a plane substantially bisecting said peach, means for moving said pit gripping means into and for holding said pit gripping means in firm engagement with the pit of said peach, a pair of peach gripping means each including peach engaging surfaces positioned about and equally spaced from a common axis normal to said plane, means supporting said pair of peach gripping means for movement toward each other along said axis with said surfaces positioned about said axis and equally spaced therefrom and for movement of said surfaces into firm frictional engagement with said peach at opposite sides of said plane, means supporting said pair of pit gripping means and said pair of peach gripping means for rotation of one pair relative to the other pair about said axis while said surfaces are in said firm engagement with said peach, means for holding said pair of pit gripping means and said pair of peach gripping means against movement transversely of said axis during rotation of one pair relative to the other, and means for rotating said one pair relative to the other pair about said common axis.

10. A pitter for clingstone peaches comprising: a pair of alined, axially movable, rotatable shafts having spaced apart adjacent ends, said shafts being provided on their adjacent spaced ends with peach gripping means, a pair of spaced apart peach splitting blades, said blades lying in a common plane normal to the axis of said shafts between the adjacent ends thereof and at least one thereof being movable in said plane, and said blades being provided with peach pit gripping toothed sections, whereby after a peach is split by said blades, its pit is gripped by said toothed sections and the peach halves rotated by said gripping means.

JOSEPH PERRELLI.

References Cited in the file of this patent

UNITED STATES PATENTS

| Number | Name | Date |
|---|---|---|
| 384,371 | Lillie | June 12, 1888 |
| 596,343 | Topp | Dec. 28, 1897 |
| 666,701 | Schneidler et al. | Jan. 29, 1901 |
| 1,365,397 | Gormley et al. | Jan. 11, 1921 |
| 1,392,518 | Paranteau | Oct. 4, 1921 |
| 1,445,146 | Kohler | Feb. 13, 1923 |
| 1,775,918 | Smith | Sept. 16, 1930 |
| 1,777,417 | Ridley | Oct. 7, 1930 |
| 2,272,415 | McLauchlin | Feb. 10, 1942 |
| 2,317,669 | Chekian | Apr. 27, 1943 |
| 2,392,451 | Barrows | Jan. 8, 1946 |
| 2,574,794 | Maxwell | Nov. 13, 1951 |
| 2,594,362 | Skog | Apr. 29, 1952 |

FOREIGN PATENTS

| Number | Country | Date |
|---|---|---|
| 112,634 | Australia | Feb. 27, 1941 |